United States Patent

Floto

[11] 3,919,020
[45] Nov. 11, 1975

[54] METHOD OF RETREADING A TIRE

[75] Inventor: James E. Floto, Akron, Ohio

[73] Assignee: The Goodyear Tire & Rubber Company, Akron, Ohio

[22] Filed: July 19, 1974

[21] Appl. No.: 489,960

[52] U.S. Cl. .............. 156/95; 156/96; 156/128 R; 156/394
[51] Int. Cl.² .. B29H 5/04; B29H 5/16; B29H 17/36
[58] Field of Search .......... 156/95, 96, 110 R, 123, 156/128 R, 130, 394 R, 394 FM, 285, 286

[56] References Cited
UNITED STATES PATENTS

| | | | |
|---|---|---|---|
| 1,707,014 | 3/1929 | Hopkinson | 156/96 |
| 2,421,099 | 5/1947 | Vogt | 156/96 |
| 3,177,918 | 4/1965 | Holman | 156/96 |
| 3,207,647 | 9/1965 | Schelkmann | 156/394 FM |
| 3,472,714 | 10/1969 | Ragan | 156/96 |
| 3,607,497 | 9/1971 | Chrobak | 156/95 |
| 3,779,832 | 12/1973 | Reppel | 156/96 |

Primary Examiner—Charles E. Van Horn
Assistant Examiner—John E. Kittle
Attorney, Agent, or Firm—F. W. Brunner; H. E. Hummer

[57] ABSTRACT

A method of retreading a tire by placing unvulcanized rubbery material on the outer buffed periphery of the tire, and then covering the material with an elastic, fluid impervious membrane during the vulcanization process to form a smooth outer surface on the vulcanized tread of the tire. A pattern of grooves are subsequently formed in the smooth peripheral surface of the vulcanized tread to provide a new tread pattern of ribs and grooves.

19 Claims, 2 Drawing Figures

METHOD OF RETREADING A TIRE

BACKGROUND OF INVENTION

The invention is particularly useful in building new aircraft tires, or retreading them. Such tires are generally built and retreaded in molds having conventional matrices for molding a desired pattern of ribs and grooves in the unvulcanized rubbery tread material on the tire casing. It has been found that treads formed in this manner are sometimes irregular; that is, they do not have a uniform cross-sectional configuration throughout their annular length. The invention is directed to a method of building a more nearly uniform tread on a tire.

Briefly stated, the invention is in a method of forming a tread on a tire. A sufficient amount of unvulcanized rubbery material is positioned annularly around the outer periphery of the tire to form at least a new tread of the tire. The unvulcanized rubbery material is then covered with an elastic membrane which is provided to shield the material from a heated fluid which is used to heat and vulcanize the material. The heated fluid, under pressure, contacts the membrane and compresses the unvulcanized rubbery material against the outer periphery of the tire while the material is being heated and vulcanized. The fluid pressure uniformly distributes the vulcanizing material over the outer periphery of the tire and produces a vulcanized tread with a generally smooth outer surface which is then grooved by any suitable means to form a desired tread pattern of ribs and grooves.

It can be appreciated that this particular method has the advantage of utilizing a single apparatus for a number of differently sized tires, whereas a different matrix, or mold is required for every size tire when conventional methods are practiced. Moreover, the highly flexible and elastic membrane combined with the uniform fluid pressure produces a more nearly uniform and symmetrical tread than one formed in a rigid matrix of a conventional mold.

DESCRIPTION OF THE DRAWING

The following description of the invention will be better understood by having reference to the annexed drawing, wherein.

ENVIRONMENT OF THE INVENTION

Figure 1:
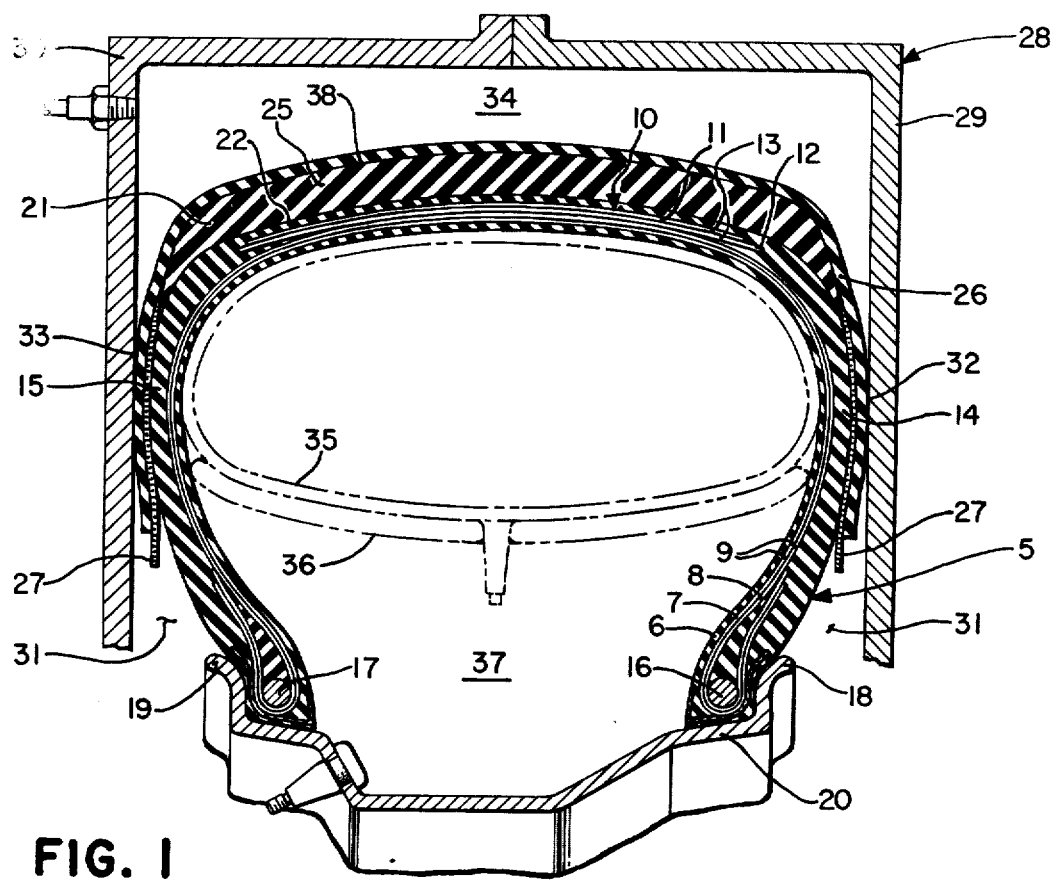
FIG. 1 is a section of a tire and apparatus used in forming a tread in accordance with the invention.

Referring to FIG. 1, there is shown an aircraft tire 5 comprising the essential components of: a fluid impervious innerliner 6; a plurality of carcass plies 7 and 8, each of which include parallel reinforcement cords 9; a breaker structure 10, including a pair of breaker plies 11 and 12, each of which have parallel reinforcement cords 13; a pair of sidewalls 14 and 15; and a pair of annular beads 16 and 17 which are designed for seating against adjacent upstanding flanges 18 and 19 of a conventional wheel rim 20 on which the tire 5 is mounted.

The invention is used to form a tread 21 on, (I) a tire 5 which is originally built with the foregoing components and a smooth, or roughened outer periphery 22 designed to accommodate the tread 21, or (II) a tire 5 which has been buffed to at least partially remove the tread 21 after it is worn and needs replacing. In any case, the outer periphery 22 of the tire 5 is preferably roughened and given a coat of any suitable rubber cement for helping bond the new tread 21 to the tire 5.

THE INVENTION

A sufficient amount of unvulcanized rubbery material 25 is placed around the outer periphery 22 of the tire 5 by any suitable means to form the tread 21. A good method of uniformly depositing the unvulcanized rubbery material on the tire 5 is to coil a preformed, thin, narrow strip of unvulcanized rubbery material successively around the outer periphery 22, in accordance with a desired contour to form a laminated tread 21. The laminates of unvulcanized rubbery material 25 are then covered with a flexible, elastic membrane 26 which is fluid impervious and composed of vulcanized rubbery material. The elastic membrane 26 is designed to prevent the heated curing medium, e.g. steam, from coming in direct contact with the unvulcanized rubbery material 25. The elastic membrane 26, under the influence of presssure from the curing medium, also acts to smooth the generally irregular or rough outer peripheral surface of the unvulcanized, laminated tread 21. It is important that the surface of the elastic membrane 26 contacting the unvulcanized rubbery material 25 of the tread 21, be as smooth as possible and free of any large ridges for forming correspondingly configured grooves in the finished tread 21, since it has been found that the finished appearance and smoothness of the outer surface of the tread 21, when vulcanized, depends on, and generally corresponds to the smoothness of the elastic membrane 26 engaging the tread 21. Any suitable means, such as a piece of conventional wicking cloth 27, may be provided for allowing the escapement of gas from between the elastic membrane 26 and unvulcanized rubbery material 25 during the molding and vulcanization of the tread 21.

The tire assembly, including the tire 5 with the unvulcanized rubbery material 25 and elastic membrane 26, is then placed in any appropriate mold-like apparatus 28 composed of at least two sections 29 and 30 which, when secured together, form an annular chamber 31 for receiving the tire assembly. The tire 5 is inflated with a fluid, under pressure, to expand the tire 5 and compress the elastic membrane 26 between the sidewalls 14 and 15 of the tire 5 and adjacent sides 32 and 33 of the mold sections 29 and 30, thereby forming a seal between the elastic membrane 26 and the adjacent sidewalls 14 and 15 of the tire 5 to prevent heated fluid from seeping under the elastic membrane 26 and contacting the unvulcanized rubbery material 25. This is accomplished in several ways. For example, the tire 5 is mounted on the wheel rim 20 and inflated with air to a desired pressure, e.g. 150 pounds per square inch (psi). An annular fluid chamber 34, sealed from the ambient atmosphere, is formed around the elastic membrane 26 between the seals thereof with the adjacent sidewalls 14 and 15 of the tire 5. The fluid chamber 34 is filled with a heated fluid, under pressure, e.g. steam under a pressure of 65 psi, or at a temperature in the range of from 200° to 350°F. A chief advantage of the foregoing method is that the tire 5 need not be demounted from the wheel rim 20 during the formation of the tread 21.

Sometimes, however, worn tires are demounted and sent to the factory for retreading. In such cases, the tire 5 with a worn tread is buffed to at least partially remove the worn tread leaving an outer periphery 22 which is suitably buffed for receiving the required amount of unvulcanized rubbery material 25. A conventional curing tube 35 and rim 36 are successively positioned within the cavity 37 of the tire 5. The rubber curing tube 35 is similarly inflated to expand the tire 5 and move the elastic membrane 26 into sealing engagement with the sidewalls 14 and 15.

Figure 2:
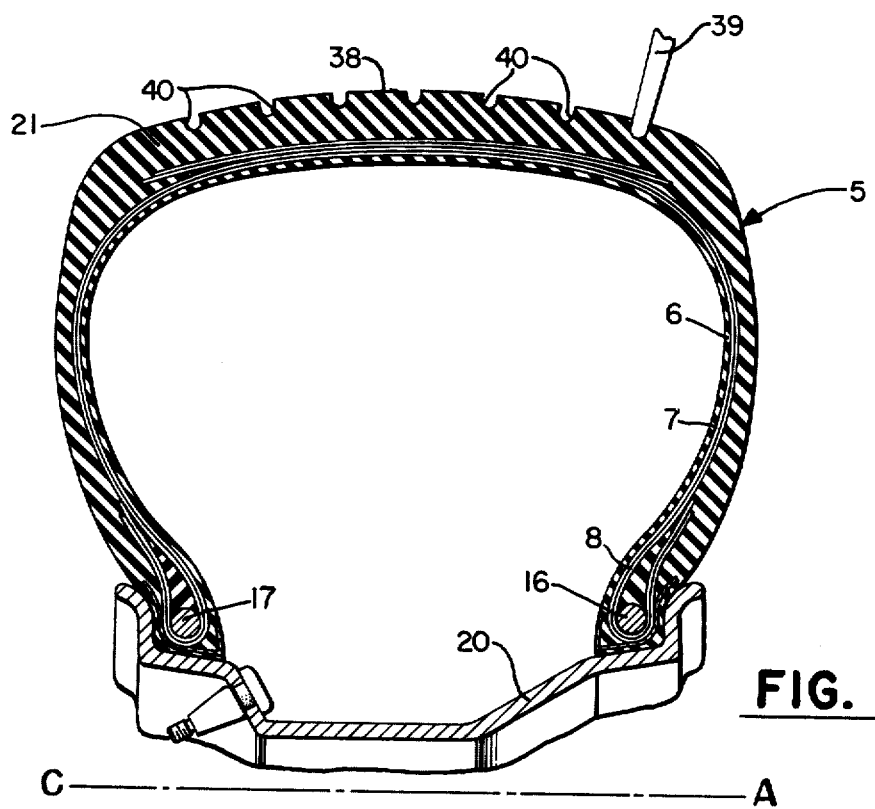
FIG. 2 is a section of the tire illustrating the grooving of the newly formed tread.

The tire 5 is removed from the mold-like apparatus 28 after the unvulcanized rubbery material 25 has been sufficiently heated and vulcanized. The fluid pressure exerted against the elastic membrane 26 is uniform and consequently produces a vulcanized tread 21 having a more nearly uniform and symmetrical cross-section, as shown in FIG. 1. Moreover, the tread 21 is vulcanized with a generally smooth outer surface 38. The tire 5 is taken to another station for grooving, after the newly formed tire tread 21 has cooled sufficiently. Any suitable means, such as a hand-held, or machine-operated grooving knife 39, is used to cut a pattern of, for example, circumferentially extending grooves 40 (FIG. 2), in the newly formed smooth-faced tread 21. In such cases, the tire 5 is rotated about its center axis CA, as the circumferential grooves 40 are cut.

Thus, there has been described a new system of placing a tread on a tire. The system is especially suitable for forming a new, replaceable tread on a new, treadless aircraft tire, or in the retreading of a worn aircraft tire, since aircraft tires are generally provided with circumferential grooves which are easily placed in a tread by a grooving tool.

While certain representative embodiments and details have been shown for the purpose of illustrating the invention, it will be apparent to those skilled in the art that various changes and modifications may be made therein without departing from the spirit or scope of the invention.

What is claimed is:

1. A method of forming a tread on a tire comprising:
   a. placing a sufficient amount of unvulcanized rubbery material on the outer periphery of the tire to at least form a new tread;
   b. covering the unvulcanized rubbery material with an elastic membrane having a smooth inner surface for contacting the unvulcanized rubbery material, the surface being free of any ridge large enough to mold a desired groove in the vulcanized tread of the tire;
   c. contacting the membrane with a heated fluid, under pressure, to compress the unvulcanized rubbery material against the outer periphery of the tire, and heat and vulcanize the compressed material such that the outer surface of the material, when vulcanized, is generally smooth; and
   d. grooving the smooth periphery of the material when it is vulcanized, to form a pattern of ribs and grooves in the newly formed tread.

2. The method of claim 1, which includes compressing the elastic membrane against adjacent sidewalls of the tire by a force other than that exerted by the heated fluid contacting the membrane to prevent any heated fluid from coming in direct contact with the unvulcanized rubbery material.

3. The method of claim 1, which includes:
   e. contacting the inner crown of the tire with fluid, under pressure, in opposed relation to the fluid pressure against the membrane, the fluid pressure against the membrane being less than the fluid pressure against the inner crown of the tire.

4. The method of claim 3, wherein the step (e) of contacting the inner crown of the tire with fluid, under pressure, includes successively positioning an elastic curing tube and rigid curing rim within the cavity of the tire, and inflating the curing tube with fluid to a desired pressure.

5. The method of claim 3, wherein the step (e) of contacting the inner crown of the tire with fluid, under pressure, includes mounting the tire on a wheel rim and inflating the mounted tire to a predetermined desired pressure.

6. The method of claim 1, wherein the membrane is composed of vulcanized rubbery material which is impervious to the heated fluid.

7. The method of claim 1, wherein the step (a) of placing unvulcanized rubbery material on the outer periphery of the tire includes coiling a strip of unvulcanized rubbery material around the outer periphery of the tire until there is a sufficient amount of material to form the desired tread, the material being shaped to a desired contour.

8. The method of claim 7, wherein the width of the strip of unvulcanized rubbery material is relatively narrow compared to the width of the outer periphery of the tire measured at right angles to a plane containing the mid-circumferential centerline of the tread, and the thickness of the strip is thin compared to the width of the strip.

9. The method of claim 1, which includes the step of buffing the tire to remove at least a partially worn tread on the tire.

10. The method of claim 9, wherein the tire is an aircraft tire.

11. The method of claim 1, wherein the tire on which the tread is formed is an unused aircraft tire which is molded and vulcanized without a tread.

12. A method of forming a tread on a tire, comprising:
    a. placing a sufficient amount of unvulcanized rubbery material on the outer periphery of the tire to at least form a new tread having a desired contour;
    b. covering the unvulcanized rubbery material with a fluid impervious, elastic membrane;
    c. contacting the membrane with a heated fluid, under pressure, to compress the unvulcanized rubbery material against the outer periphery of the tire, and heat and vulcanize the compressed material such that the outer surface of the material, when vulcanized, is generally smooth;
    d. compressing the elastic membrane against adjacent sidewalls of the tire by a force other than that exerted by the heated fluid contacting the membrane to prevent any heated fluid from coming in direct contact with the unvulcanized rubbery material; and
    e. grooving the smooth outer surface of the newly formed tread when the material is sufficiently vulcanized and cooled.

13. The method of claim 12, which includes:
    f. contacting the inner crown of the tire with fluid, under pressure, in opposed relation to the fluid pressure against the membrane, the fluid pressure against the membrane being less than the fluid pressure against the inner crown of the tire.

14. The method of claim 13, which includes:
    g. placing the tire with the unvulcanized rubbery material in a mold-like apparatus composed of multiparts which are secured together to form, (I) an annular cavity for receiving the tire, and (II) a fluid chamber adjacent the unvulcanized rubbery material covered by the membrane when the tire is positioned in the cavity.

15. The method of claim 14, wherein the step (c) of contacting the elastic membrane with fluid, under pressure, includes:
  h. filling the fluid chamber with steam at a temperature in the range of from 200° to 350°F.

16. The method of claim 14, wherein step (d) of compressing the elastic membrane against the sidewalls of the tire includes forming a seal between the membrane, adjacent sidewalls of the tire, and portions of the mold-like apparatus closest the adjacent sidewalls.

17. The method of claim 16, which includes placing the space between the elastic membrane and unvulcanized rubbery material in commumication with means for allowing the escape of fluid trapped between the membrane and material.

18. The method of claim 16, which includes:
  i. buffing the tire to at least partially remove a worn tread on the tire; and
  j. placing the unvulcanized rubbery material on and around the buffed periphery of the tire.

19. The method of claim 18, wherein the tire with the worn tread is an aircraft tire.

* * * * *